(12) United States Patent
Mierle

(10) Patent No.: US 8,666,195 B1
(45) Date of Patent: Mar. 4, 2014

(54) IMAGE ALIGNMENT

(75) Inventor: Keir B. Mierle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 13/047,937

(22) Filed: Mar. 15, 2011

(51) Int. Cl.
*G06K 9/32* (2006.01)

(52) U.S. Cl.
USPC ............. 382/295; 359/24; 382/107; 382/225; 382/276; 382/294; 382/299; 382/307; 701/532

(58) Field of Classification Search
None
See application file for complete search history.

(56) References Cited

U.S. PATENT DOCUMENTS

| | | | |
|---|---|---|---|
| 6,009,212 A * | 12/1999 | Miller et al. | 382/294 |
| 6,738,532 B1 * | 5/2004 | Oldroyd | 382/294 |
| 6,798,897 B1 * | 9/2004 | Rosenberg | 382/107 |
| 7,869,667 B1 * | 1/2011 | Wu | 382/307 |
| 7,912,321 B1 * | 3/2011 | Simonson | 382/294 |
| 8,160,397 B1 * | 4/2012 | Wu | 382/294 |
| 2003/0198402 A1 * | 10/2003 | Zhang et al. | 382/276 |
| 2005/0180657 A1 * | 8/2005 | Zhang et al. | 382/294 |
| 2007/0003165 A1 * | 1/2007 | Sibiryakov et al. | 382/294 |
| 2007/0127101 A1 * | 6/2007 | Oldroyd | 359/24 |
| 2008/0144972 A1 * | 6/2008 | Kang et al. | 382/294 |
| 2009/0257683 A1 * | 10/2009 | Cloud et al. | 382/299 |
| 2011/0282578 A1 * | 11/2011 | Miksa et al. | 701/208 |
| 2012/0328203 A1 * | 12/2012 | Medasani et al. | 382/225 |

OTHER PUBLICATIONS

Lowe, D., "Object Recognition from Local Scale-Invariant Features," ICCV '99 Proceedings of the Seventh IEEE International Conference on Computer Vision—vol. 2, Sep. 1999, 8 pages.

* cited by examiner

*Primary Examiner* — Tsung-Yin Tsai
(74) *Attorney, Agent, or Firm* — Fish & Richardson P.C.

(57) ABSTRACT

Methods, systems, and apparatus, including computer programs encoded on a computer storage medium, for graphical overlay object translation. One of the methods includes receiving a first plurality of first feature points, each first feature point being associated with a plurality of feature descriptors and a respective location on the first digital image. The method includes receiving a second plurality of second feature points, each second feature point being associated with a plurality of feature descriptors and a respective location on the second digital image. The method includes determining the translation offset for the second digital image from the first digital image by matching locations of the first feature points with locations of the second feature points without regard to the feature descriptors.

20 Claims, 8 Drawing Sheets

| 502<br><br>Offset<br>(6.5, 1.5) | 504<br><br>Offset<br>(6.55, 1.55) | 506<br><br>Offset<br>(6.55, 1.55) |
|---|---|---|
| 508<br><br>Offset<br>(6.45, 1.55) | 510<br><br>Offset<br>(6.5, 1.50) | 512<br><br>Offset<br>(6.55, 1.55) |
| 514<br><br>Offset<br>(6.4, 1.50) | 516<br><br>Offset<br>(6.45, 1.55) | 518<br><br>Offset<br>(6.55, 1.50) |

FIG. 5A

IMAGE ALIGNMENT

BACKGROUND

This specification relates to feature detection.

One problem in computer vision is determining the two dimensional or three dimensional relationships between two images of the same object taken using two dimensional cameras. One way to solve this problem is to leverage algorithms such as Scale-Invariant Feature Transform (SIFT) or Speeded Up Robust Features (SURF) to identify feature points in 2D images, and then match the features between the images. Each feature point is associated with a descriptor that describes the feature point using a vector. The contents of the vector can vary based on the algorithm used to identify the feature point. For example, in the SIFT algorithm, the vector can include histograms of eight bins computed from the magnitude and orientation of a sample in a region of 16 pixels by 16 pixels around the feature point. A separate histogram can be calculated for each 4 pixel by 4 pixel region. The magnitude can be further weighted by Gaussian function. The resulting bin values can be normalized. The value for each bin is stored separately in the vector. Vectors created using the SIFT algorithm contain 128 elements. A typical image may include 200 or more feature points.

For images taken outdoors at different times, the vectors associated with otherwise corresponding feature points may not match due to seasonal variations, lighting changes, and other changes to that may occur over time.

SUMMARY

In general, one innovative aspect of the subject matter described in this specification can be embodied in methods that include the actions of receiving a first plurality of first feature points, each first feature point being associated with a plurality of feature descriptors and a respective location on the first digital image. Methods also include the actions of receiving a second plurality of second feature points, each second feature point being associated with a plurality of feature descriptors and a respective location on the second digital image. Methods also include the actions of determining the translation offset for the second digital image from the first digital image by matching locations of the first feature points with locations of the second feature points without regard to the feature descriptors.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The method can include the actions of applying the translation offset to a graphical overlay object, the graphical overlay object having a location on the first image. Determining a translation offset may include selecting a first anchor feature from the first plurality of first features; selecting a second anchor feature from the second plurality of second features; determining a potential translation offset based on the location of the first anchor feature and the location of the second anchor feature; counting a count of second features in the second plurality of features present at locations identified by the locations of the first features in the first plurality of features and the potential translation offset; and assigning the potential translation offset as the translation offset in response to the count exceeding a threshold value. The first image and the second image may be ortho-rectified. The method may include the actions of determining the first plurality of first feature points and the second plurality of second feature points using a feature detector implementing a Scale-Invariant Feature Transform (SIFT) or Speeded Up Robust Features (SURF) feature detection algorithm.

Particular embodiments of the subject matter described in this specification can be implemented so as to realize one or more of the following advantages. Offsets between two images can be calculated. The graphical overlay objects associated with locations on one image can be adjusted to be associated with the second image. Offsets can be calculated for images taken during different seasons, from slightly different perspectives, with slight cloud coverage, and with changed urban landscape including, for example, new roads, or buildings.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A illustrates an example of offsets for different geo-referenced tiles.

Like reference numbers and designations in the various drawings indicate like elements.

DETAILED DESCRIPTION

Figure 1:
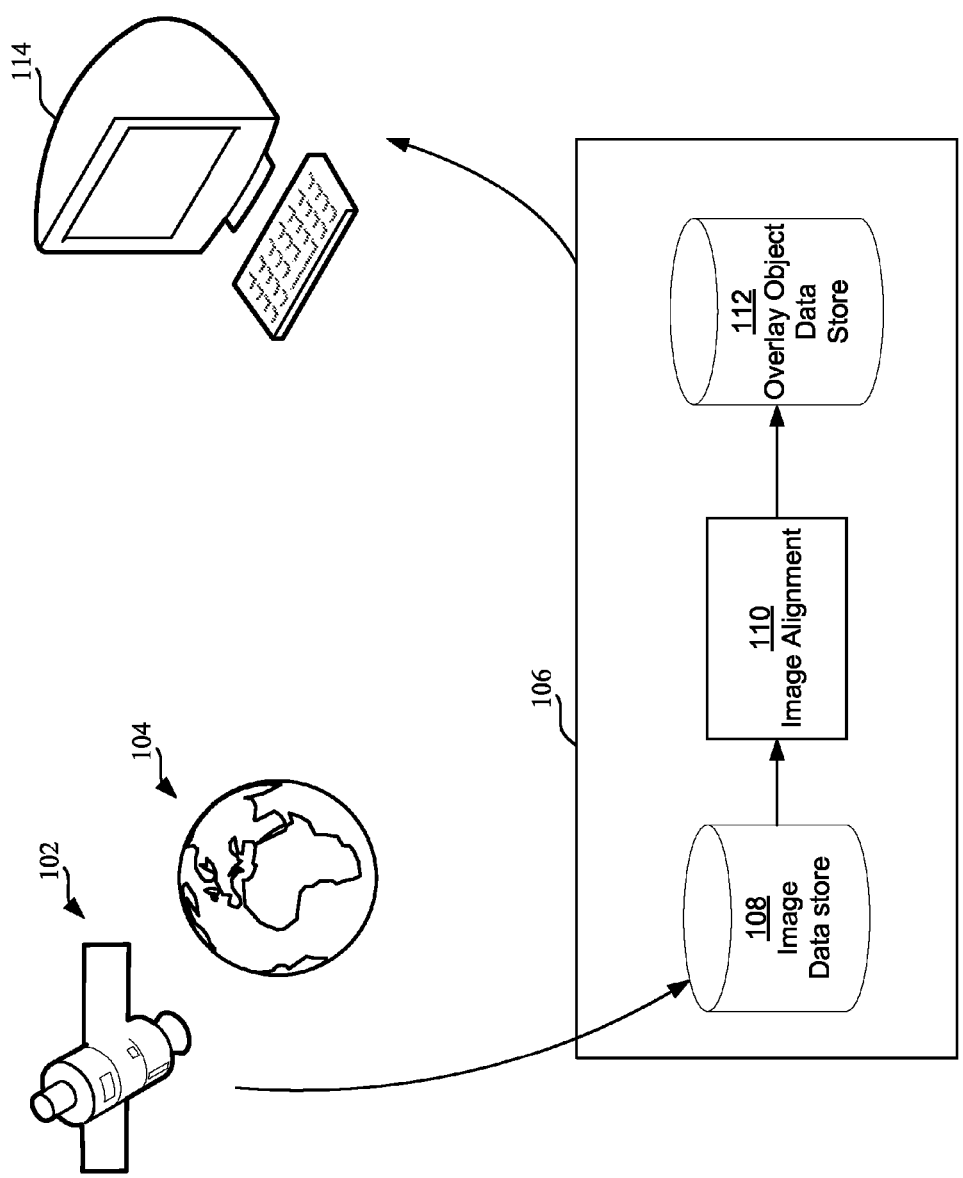
FIG. 1 illustrates an example of a system that can perform image alignment.

FIG. 1 illustrates an example system that can perform image alignment. Aerial images of the earth 104 are stored in an image data store 108 that is in communication with a server 106. The images can originate from a satellite 102 or an airplane, for example. The server 106 can be implemented on one or more computers operating in one or more locations.

In some implementations, the larger images, for example, 10,000 pixels by 10,000 pixels can be divided into tiles of equal size, for example, 512 pixels by 512 pixels. The received images can be updates to existing images in the image data store 108, for example, the tiles may be placed into a geo-referenced frame. However, the old and the updated images may not be aligned. In terms of tiles, the new image in the new tile may be offset from the old image in the old tile in one or two directions by some numbers of pixels, which may be, but need not be, whole numbers. The offset can be described using a rectangular coordinate system, for example (5,5). The offset can also be described using a circular coordinate system, for example (7.07, 45 degrees). Other coordinate systems can also be used.

Graphical overlay objects are associated with the old images. The graphical overlay objects can represent, for example, roads, schools, hospitals, gas stations, or other landmarks, natural features, for example, rivers or mountains, or political features, for example, political boundaries. Each graphical overlay object has a position relative to an old image. In order to apply the graphical overlay object to the new image, an offset between the old image and the new image is determined. This can be done by an image alignment component 110 on the server 106. The image alignment component 110 can be, for example, a software component that is implemented and can be executed on the server 106. The image alignment component 110 determines an offset between the old image and the new image. The image alignment component applies the offset to specify the correct location of the related graphical overlay objects to the updated objects in the graphical overlay object data store 112. The updated (new) images in the image data store 108 and the adjusted graphical overlay objects can be provided to a computer 114, for example, as part of a trip planning program.

Figure 2:
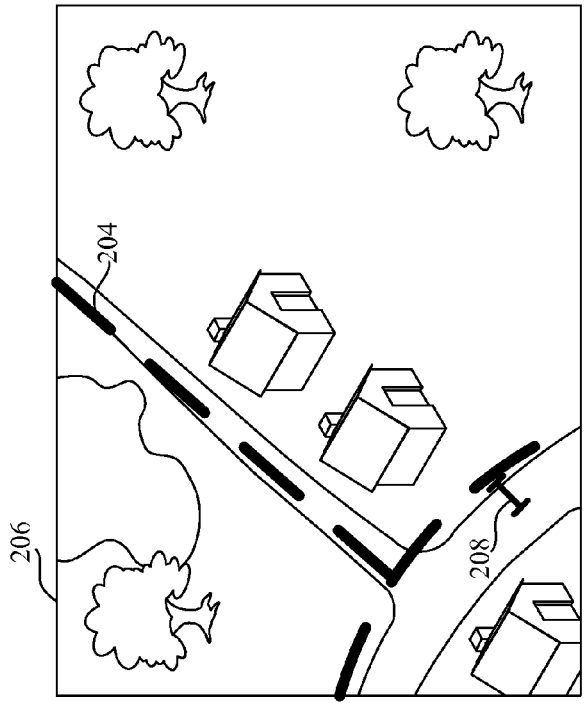
FIG. 2 illustrates two example images.
Figure 2:
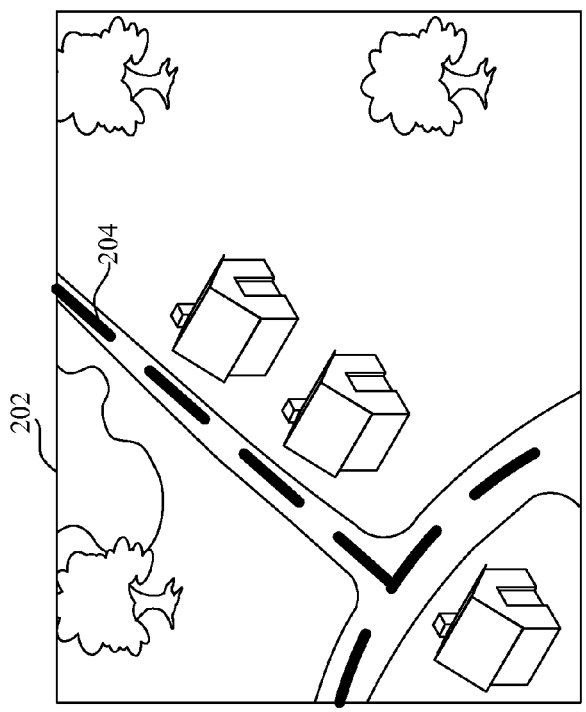

FIG. 2 illustrates two example images. In this example, the first image 202 is received by a system and associated with a graphical overlay object that describes the location of a road descriptor 204. At a later time, the system receives a second image 206. As described above, the second image 206 is of the same general geographic area as the first image 202 but is not an identical image. For example, the image may be taken from a slightly different position resulting in an offset 208 between the first image 202 and the second image 206.

As a result, graphical overlay objects associated with the first image, for example the road descriptor 204, are not positioned correctly relative to the image when applied to the second image 206 using its coordinates (e.g., its pixel coordinates) on the first image.

Figure 3:
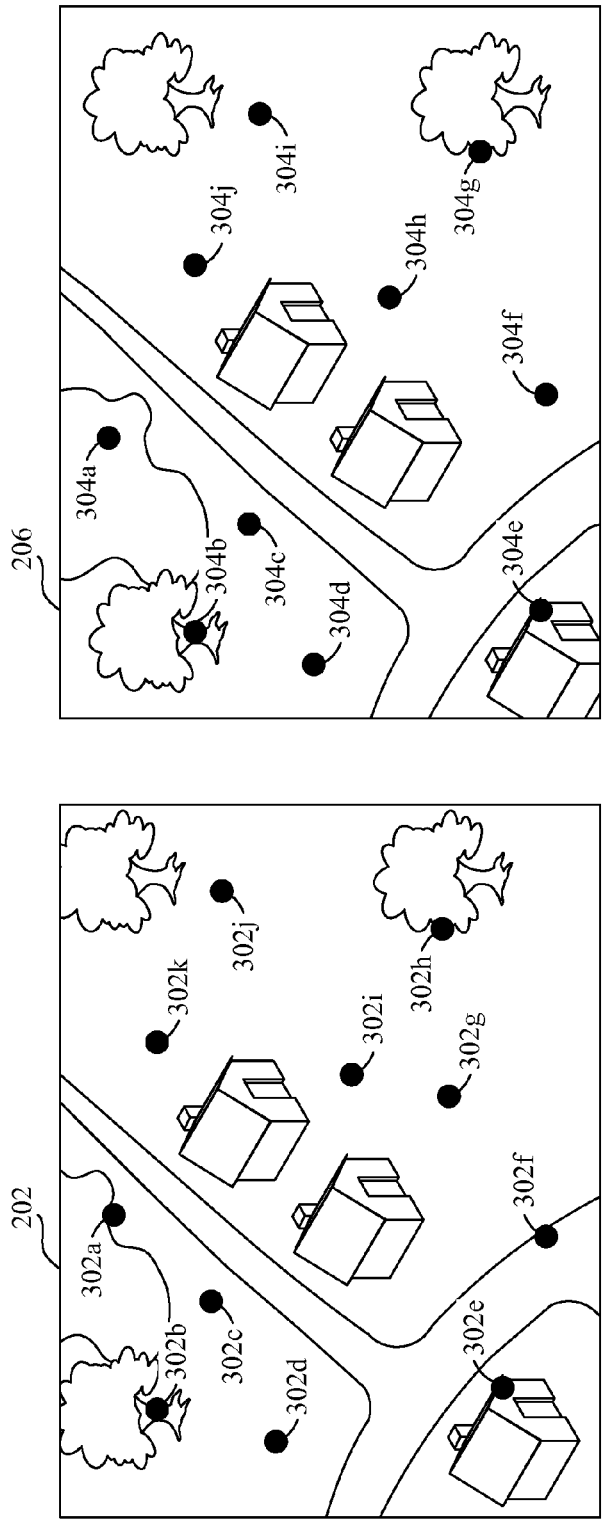
FIG. 3 illustrates identified feature points on the two images.

FIG. 3 illustrates identified feature points on the two images. The first image 202 has identified feature points 302a-k. The feature points can be identified, for example, using conventional computer vision techniques, for example, using feature detector software modules implementing SIFT or SURF algorithms. In general, computer vision techniques generate image descriptors describing feature points on the image. These image descriptors can include vectors of k elements describing the features of the image at the location of the point. In conventional matching techniques, descriptors of feature points in the first image are compared to the descriptors of feature points in the second image to determine which feature points are the most similar, i.e., which descriptor on the second image is the shortest distance from a similar descriptor on the first image.

The feature detector program or programs can identify feature points for features of multiple types. Examples of types of features include lines, edges, corners, blobs, or ridges. Edges can identify a boundary between two image regions. For example, an edge can be a point on an image that has strong gradient magnitude. Corners can be points on an image that has a high level of curvature in the image gradient. Blobs can identify a region of an image that is either brighter or darker than the surrounding image. A feature point associated with a blob can be located at the local maximum of the blob. Ridges can be points of local maxima or local minima and can capture the location of elongated objects in the interior of the image. Other types of features can also be used.

Similarly, feature points 304a-j are identified on the second image 206. Generally, the same feature detector or detectors are used to identify feature points in the first image 202 and in the second image 206.

Points on an image, for example the first image 202 and second image 206, are identified using an image coordinate system. For example, a point can be described in terms of a number of horizontal and vertical pixels from the upper left portion of the image.

In some implementations, the images are ortho-rectified to account for distortions in the image caused by topographical variations of the earth's surface and any tilt or angle from which the image was taken. In some implementations, each image is the same size, for example a 512 pixels by 512 pixels square.

Figure 4A:
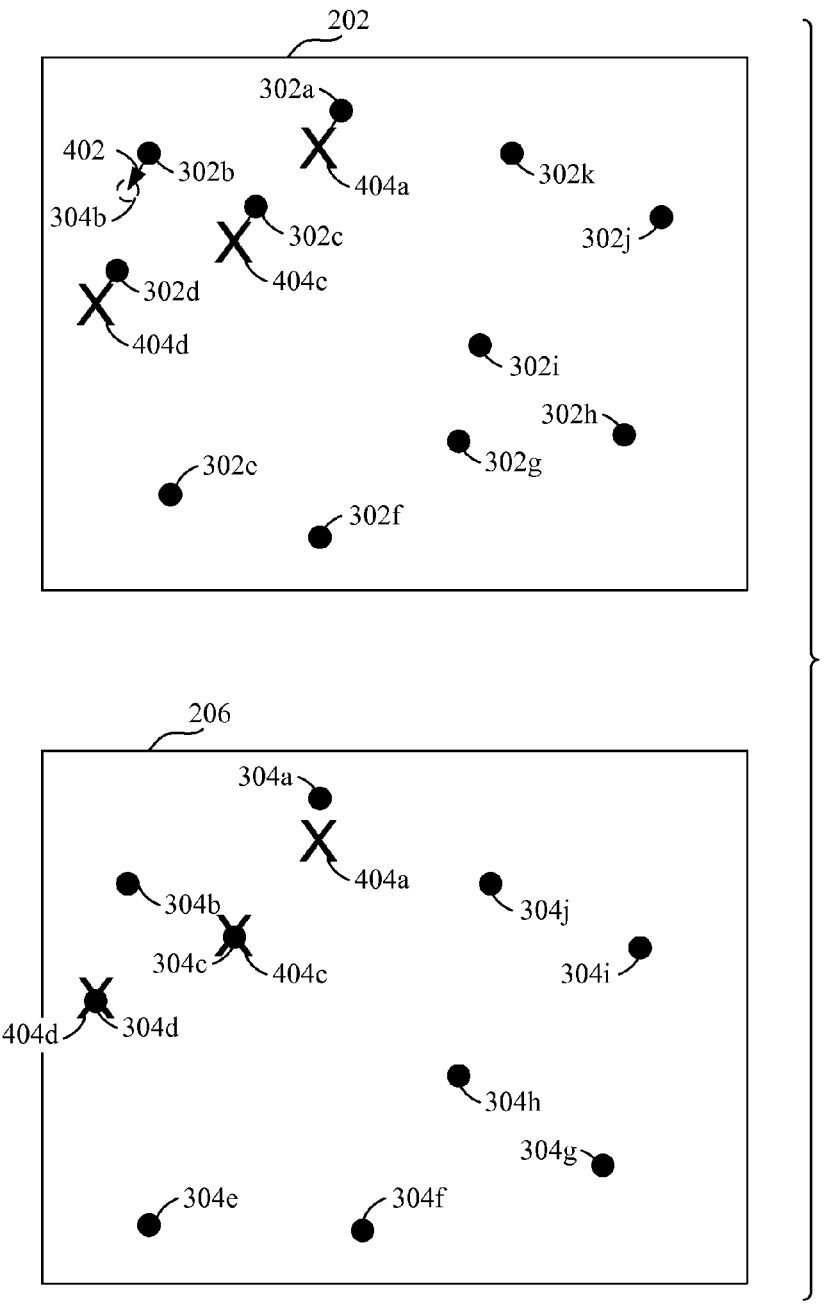
FIG. 4A-B illustrates using features to determine an offset between two images.
Figure 4B:
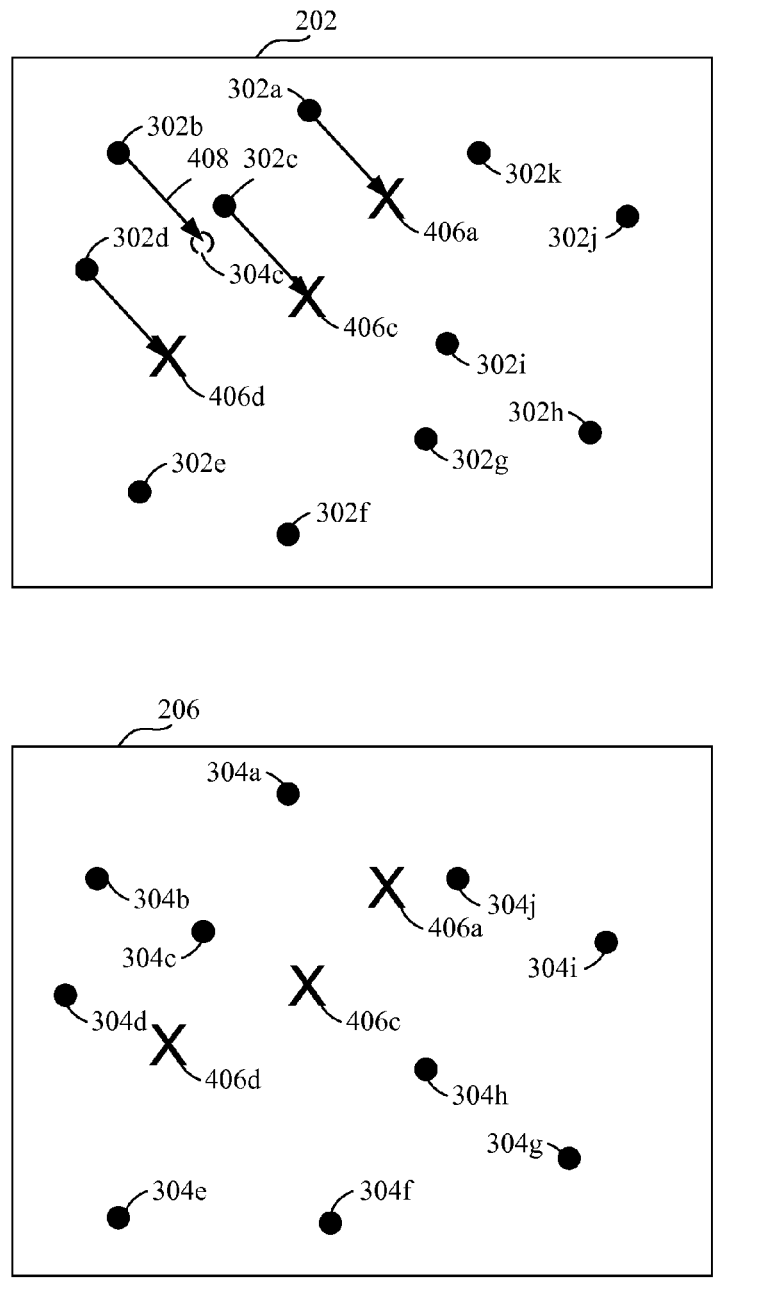

FIG. 4A-B illustrates using features to determine an offset between two images. Referring to FIG. 4A, the system selects a first feature point in the first image 202 and a second feature point in the second image 206 as anchor points. The location of the first selected anchor point 302b in image coordinates of the first image 202 is compared to the location of the second selected anchor point 304b in image coordinates of the second image 206. The system determines an offset 402 using the location of the first selected anchor point 302b and the location of the second selected anchor point 304b. In some implementations, the system only selects points where the location of the first selected anchor point 302b and the location of the second selected anchor point 304b are within a threshold distance, for example, a maximum of a 10 pixels Euclidean distance.

The system applies the offset to the locations of other feature points in the first image 202. For example, applying the offset to the location of the point 302d determines the location 404d, applying the offset to the location of point 302c determines the location 404c, and applying the offset to the location of point 302a determines the location 404a. For example, if point 302a is located 50 pixels from the left and 200 pixels from the top (i.e., at coordinates (50,200)), and the offset is 5 pixels to the left and 5 pixels down (i.e., (−5, 5)), the resulting location in the second image is at coordinates (45, 205).

The system compares the determined locations 404a, 404c, 404d to the locations of feature points on the second image 206. For example, the location 404d corresponds to location 304 and, the location 404c corresponds to location 304c. Not all determined locations correspond to the locations of feature points on the second image 206. For example, location 404a does not correspond to the location of any feature point in the second image.

In some implementations, two locations correspond if they have identical pixel coordinates. In other implementations, two locations correspond if they are within a given Euclidean distance of each other, for example, 1.2, 2.0, 3.3, 4.1, or 10 pixels.

In some implementations, the system determines that the offset is valid if the number of corresponding locations exceeds a threshold (e.g., 4, 5, 6, or 10 corresponding locations). In scenarios where the offset is not valid, the system selects two new anchor points and determines a new offset. The process can be repeated for each pair of potential anchor points. For example, the system may compute offsets and a number of corresponding locations for point 302a and 304a; point 302a and 304b; point 302a and point 304c; etc. In some implementations, the system stops checking for corresponding locations once the threshold is reached. In other implementations, the system checks each pair of potential anchor points and determines the offset with the largest number of corresponding locations is the offset.

Referring to FIG. 4B, in some scenarios, the selected anchor points do not describe a translation offset. For example, if the system selects feature point 302b and feature point 304c as anchor points, the system determines an offset 408. Applying the offset to the locations of feature points 302a, 302c, and 302d determines the locations 406a, 406c, and 406d. As shown on the second image 206, locations 406a, 406c, and 406d do not correspond to any feature point. Applying the offset 408 to the remaining feature points 302e-302k would similarly fail to identify locations that correspond to feature points on the second image. For clarity, these additional identified locations are not shown.

Once the offset has been determined, in some implementations, the offset is applied to locations associated with graphical overlay objects. For example, a graphical overlay object may indicate that a school is located at location (100, 100) of an older image and the offset between the old image and the new image is determined to be (10,−10), then the graphical overlay object indicating the school would be determined to be at location (110, 90) of the new image.

The following pseudo-code describes one example of an implementation of a process of identifying an offset.

```
Let features1 be the set of all feature points in the
first image.
    Let features2 be the set of all features points in the
second image.
    For each firstAnchor in features1:
        For each secondAnchor in features2:
            testOffset = determineOffset
                (firstAnchor.location,
                secondAnchor. location)
            count = 0
            For each feature in features1:
                testlocation = applyOffset
                    (feature.location, testOffset)
                if compareFeatureLocations
                    (testlocation, features2) == true:
                    count = count + 1
            if count >= threshold:
                offset = testOffset
                break
```

FIG. 5A illustrates an example of offsets for different geo-referenced tiles. In implementations where multiple tiles are created from a larger image, different offsets for different tiles can be resolved using interpolation. Tile 502 has an offset of (6.5, 1.5), tile 504 has an offset of (6.55, 1.55), tile 506 has an offset of (6.55, 1.55), tile 508 has an offset of (6.45, 1.55), tile 510 has an offset of (6.5, 1.5), tile 512 has an offset of (6.55, 1.55), tile 514 has an offset of (6.4, 1.5), tile 516 has an offset of (6.45, 1.55), and tile 518 has an offset of (6.55, 1.50), In order to reconcile the offsets a warp can be applied to all the tiles. The warp smoothly interpolates between the anchor points for the tiles, creating a single, smooth, nonlinear warp. The warp can be created using processes implementing conventional algorithms, for example, a thin plate spline.

In some implementation, for sets of images including a large number of offsets, for example, greater than 2000 different offsets, the offsets can be stored in a spatial data structure such as a k-dimensional tree. The spatial data structure enables a process to rapidly identify offsets of a particular area. Using the offsets in an area around the point to be updated, a localized warp can be computed. The localized warp can be, for example, a thin plate spline, created from the offsets in the area around the point.

In some implementations, graphical overlay objects that overlay multiple tiles are adjusted using the warp.

Figure 5B:
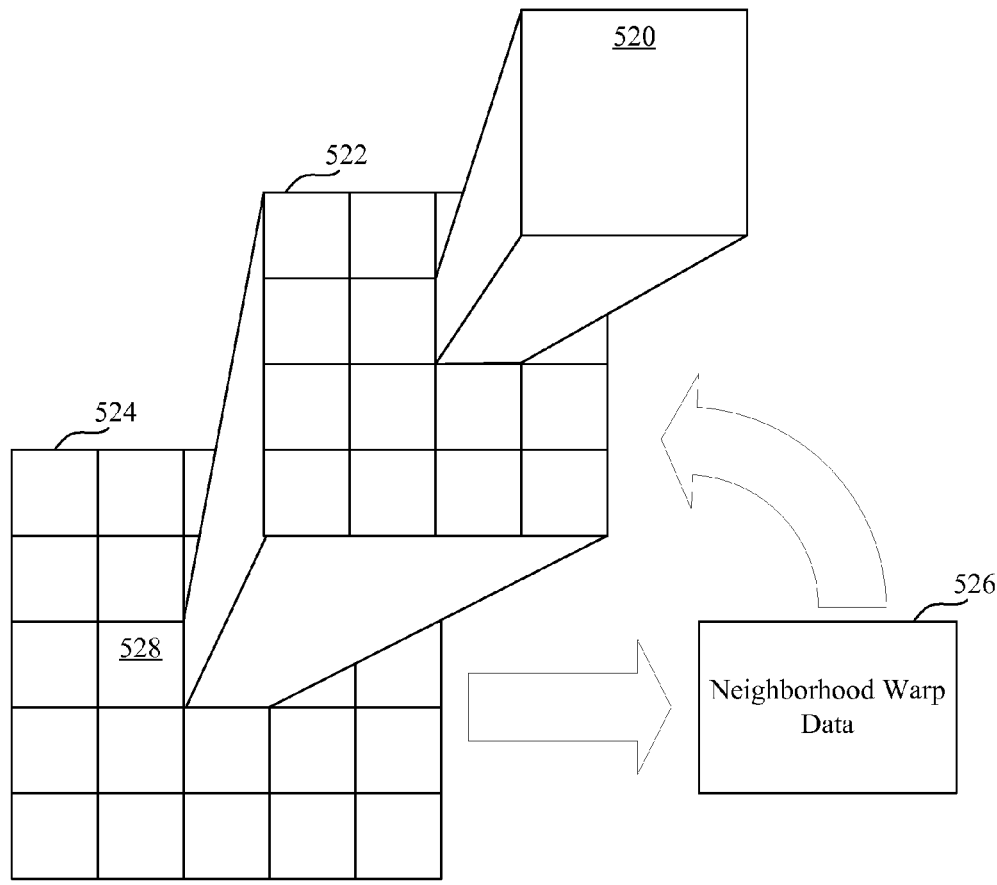
FIG. 5B illustrates an example of applying a neighborhood warp to different tiles.

FIG. 5B illustrates an example of applying a neighborhood warp to different tiles. Tile 520 is one tile in a tile neighborhood 522. The tile 420 can include, for example, a 512 pixel by 512 pixel image. In this example, the tile neighborhood 522 includes 16 tiles arranged in a 4×4 grid. Each tile in the tile neighborhood 522 has an offset, identified using the process described above.

Tile neighborhoods can be grouped together into warp regions. In this example, tile neighborhood 522 is the central tile neighborhood in a warp region 524 that includes twenty-five tile neighborhoods arranged in a five by five grid. Therefore, each warp region 524 includes twenty-five tile neighborhoods and 400 tiles. The system can use the offsets of the 400 tiles in the warp region to generate neighborhood warp data 526. The warp data can be generated using conventional warping techniques. For example, warp data can be a thin plate spline.

The neighborhood warp data 526 can be applied to graphical overlay objects associated with the tiles in the central tile neighborhood 522. In some implementations, the neighborhood warp data can be stored and reused for all tiles in the central tile neighborhood.

The neighborhood warp data 526 is only valid for the central tile neighborhood 522. For example, to apply a warp to tiles in the tile neighborhood 526, a new neighborhood warp and accompanying neighborhood warp data must be generated from a warp region having the warp neighborhood 528 in the center.

Figure 6:
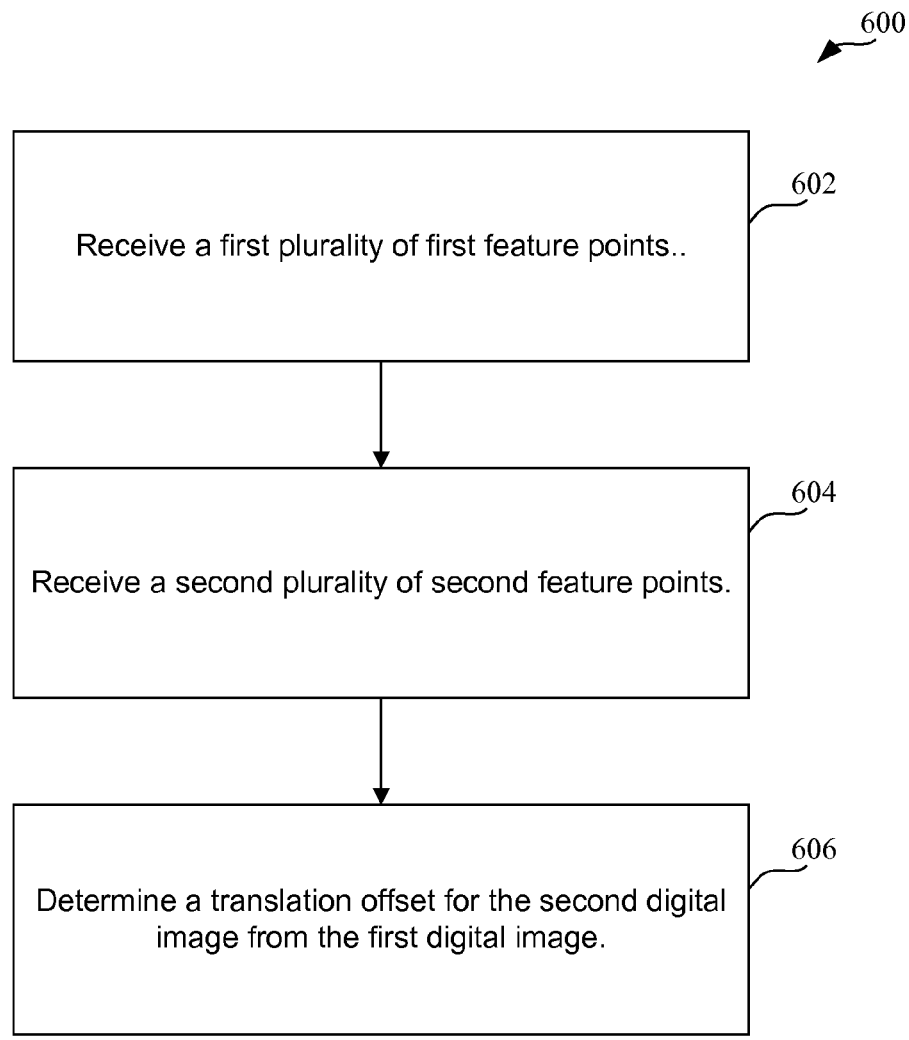
FIG. 6 is a flowchart of an image alignment process.

FIG. 6 is a flowchart of an image alignment process 600. For convenience, the process will be described with reference to a system that performs the operations of the process. The system can be, for example, the server 106 described in reference to FIG. 1.

The process 600 receives (602) a first plurality of first feature points, each first feature point being associated with a plurality of feature descriptors and a respective location on the first digital image.

The process 600 receives (604) receiving a second plurality of second feature points, each second feature point being associated with a plurality of feature descriptors and a respective location on the second digital image. Generally, first and second images are taken at different times. Generally, the second plurality of second features points is determined using the same algorithm used to generate the first plurality of first features.

The process 600 determines (606) a translation offset for aligning the first digital image to the second digital image. The translation offset is determined by matching locations of the first feature points with locations of the second feature points without regard to the feature descriptors.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for determining a translation offset between a first digital image and a second digital image, the method comprising:
   receiving a first plurality of first feature points, each first feature point being associated with a plurality of feature descriptors and a respective location on the first digital image;
   receiving a second plurality of second feature points, each second feature point being associated with a plurality of feature descriptors and a respective location on the second digital image; and
   determining the translation offset for the second digital image from the first digital image by matching locations of the first feature points with locations of the second feature points including comparing coordinates of the respective feature points without regard to the content of the corresponding feature descriptors, wherein determining the translation offset comprises:
      selecting a first anchor point from the first plurality of first feature points,
      selecting a second anchor point from the second plurality of second feature points,
      determining a potential translation offset based on the coordinate location of the first anchor point and the coordinate location of the second anchor point,
      applying the potential translation offset to the coordinate locations of other first feature points of the first plurality of feature points,
      comparing the translation offset coordinate locations of the first feature points to the coordinate locations of the plurality of second feature points to determine corresponding feature points,
      counting a count of corresponding feature points, and
      assigning the potential translation offset as the translation offset in response to the count exceeding a threshold value.

2. The method of claim 1, further comprising:
   a plurality of graphical overlay objects associated with the first digital image, each graphical overlay object having a position relative to the first digital image; and
   applying the determined translation offset to each of the plurality of graphical overlay objects to generate adjusted graphical overlay objects associated with the second digital image.

3. The method of claim 2, further comprising:
   storing the locations of each of the adjusted plurality of graphical overlay objects along with the second digital image.

4. The method of claim 2, wherein the plurality of graphical overlay objects represent one or more of landmarks, natural features, or political features.

5. The method of claim 1, wherein the first image and the second image are ortho-rectified.

6. The method of claim 1, further comprising:
   determining the first plurality of first feature points and the second plurality of second feature points using a feature detector implementing a Scale-Invariant Feature Transform (SIFT) or Speeded Up Robust Features (SURF) feature detection algorithm.

7. The method of claim 1, wherein determining the translation offset further includes selecting subsequent pairs of anchor points from the first plurality of first feature point and the second plurality of second feature points, respectively, and determining a corresponding additional potential translation offset, wherein the particular potential translation offset assigned as the translation offset corresponds to the potential translation offset with the largest count of corresponding feature points.

8. A non-transitory computer storage medium encoded with computer program instructions that when executed by one or more computers cause the one or more computers to perform operations comprising:
   receiving a first plurality of first feature points, each first feature point being associated with a plurality of feature descriptors and a respective location on the first digital image;
   receiving a second plurality of second feature points, each second feature point being associated with a plurality of feature descriptors and a respective location on the second digital image; and
   determining the translation offset for the second digital image from the first digital image by matching locations of the first feature points with locations of the second feature points including comparing coordinates of the respective feature points without regard to the content of the corresponding feature descriptors, wherein determining the translation offset comprises:
      selecting a first anchor point from the first plurality of first feature points,
      selecting a second anchor point from the second plurality of second feature points,
      determining a potential translation offset based on the coordinate location of the first anchor point and the coordinate location of the second anchor point,
      applying the potential translation offset to the coordinate locations of other first feature points of the first plurality of feature points,
      comparing the translation offset coordinate locations of the first feature points to the coordinate locations of the plurality of second feature points to determine corresponding feature points,
      counting a count of corresponding feature points, and
      assigning the potential translation offset as the translation offset in response to the count exceeding a threshold value.

9. The computer storage medium of claim 8, further comprising computer program instructions that when executed by one or more computers cause the one or more computers to perform operations comprising:
   a plurality of graphical overlay objects associated with the first digital image, each graphical overlay object having a position relative to the first digital image; and
   applying the determined translation offset to each of the plurality of graphical overlay objects to generate adjusted graphical overlay objects associated with the second digital image.

10. The computer storage medium of claim 9, further comprising computer program instructions that when executed by one or more computers cause the one or more computers to perform operations comprising:

storing the locations of each of the adjusted plurality of graphical overlay objects along with the second digital image.

11. The computer storage medium of claim 9, wherein the plurality of graphical overlay objects represent one or more of landmarks, natural features, or political features.

12. The computer storage medium of claim 8, wherein the first image and the second image are ortho-rectified.

13. The computer storage medium of claim 8, further comprising computer program instructions that when executed by one or more computers cause the one or more computers to perform operations comprising:
  determining the first plurality of first feature points and the second plurality of second feature points using a feature detector implementing a Scale-Invariant Feature Transform (SIFT) or Speeded Up Robust Features (SURF) feature detection algorithm.

14. The computer storage medium of claim 8, wherein determining the translation offset further includes selecting subsequent pairs of anchor points from the first plurality of first feature point and the second plurality of second feature points, respectively, and determining a corresponding additional potential translation offset, wherein the particular potential translation offset assigned as the translation offset corresponds to the potential translation offset with the largest count of corresponding feature points.

15. A system comprising:
  one or more computers and one or more storage devices storing instructions that are operable, when executed by the one or more computers, to cause the one or more computers to perform operations comprising:
    receiving a first plurality of first feature points, each first feature point being associated with a plurality of feature descriptors and a respective location on the first digital image;
    receiving a second plurality of second feature points, each second feature point being associated with a plurality of feature descriptors and a respective location on the second digital image; and
    determining the translation offset for the second digital image from the first digital image by matching locations of the first feature points with locations of the second feature points including comparing coordinates of the respective feature points without regard to the content of the corresponding feature descriptors, wherein determining the translation offset comprises:
      selecting a first anchor point from the first plurality of first feature points,
      selecting a second anchor point from the second plurality of second feature points,
      determining a potential translation offset based on the coordinate location of the first anchor point and the coordinate location of the second anchor point,
      applying the potential translation offset to the coordinate locations of other first feature points of the first plurality of feature points,
      comparing the translation offset coordinate locations of the first feature points to the coordinate locations of the plurality of second feature points to determine corresponding feature points,
      counting a count corresponding feature points, and
      assigning the potential translation offset as the translation offset in response to the count exceeding a threshold value.

16. The system of claim 15, further comprising:
  a plurality of graphical overlay objects associated with the first digital image, each graphical overlay object having a position relative to the first digital image; and
  applying the determined translation offset to each of the plurality of graphical overlay object, the graphical overlay objects to generate adjusted graphical overlay objects associated with the second digital image.

17. The system of claim 16, further comprising:
  storing the locations of each of the adjusted plurality of graphical overlay objects along with the second digital image.

18. The system of claim 15, wherein the first image and the second image are ortho-rectified.

19. The system of claim 15, further comprising:
  determining the first plurality of first feature points and the second plurality of second feature points using a feature detector implementing a Scale-Invariant Feature Transform (SIFT) or Speeded Up Robust Features (SURF) feature detection algorithm.

20. The system of claim 15, wherein determining the translation offset further includes selecting subsequent pairs of anchor points from the first plurality of first feature point and the second plurality of second feature points, respectively, and determining a corresponding additional potential translation offset, wherein the particular potential translation offset assigned as the translation offset corresponds to the potential translation offset with the largest count of corresponding feature points.

* * * * *